May 22, 1956
R. A. THOMPSON
2,746,497
TAPER TOOL FOR TAPERING FIBER
CONDUIT OR PIPE IN THE FIELD
Filed Sept. 29, 1953
2 Sheets—Sheet 1
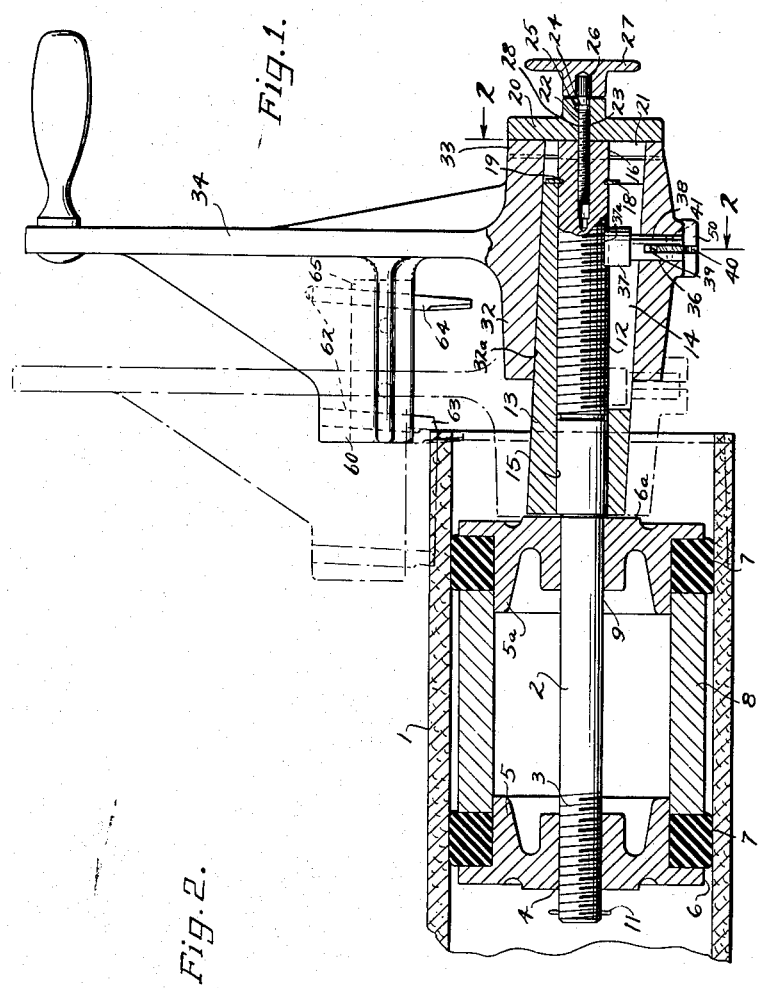
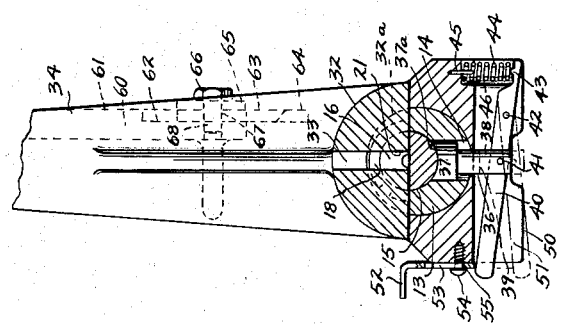
Raymond A. Thompson
INVENTOR.
BY *Charles A. Crudell*
ATTORNEY May 22, 1956

R. A. THOMPSON 2,746,497

TAPER TOOL FOR TAPERING FIBER
CONDUIT OR PIPE IN THE FIELD

Filed Sept. 29, 1953

Raymond A. Thompson
INVENTOR.

BY *Charles A. Lindell*

ATTORNEY

United States Patent Office 2,746,497
Patented May 22, 1956

2,746,497

TAPER TOOL FOR TAPERING FIBER CONDUIT OR PIPE IN THE FIELD

Raymond A. Thompson, Milwaukee, Wis., assignor to McGraw Electric Company, Milwaukee, Wis., a corporation of Delaware Application September 29, 1953, Serial No. 382,973

7 Claims. (Cl. 144—205)

This invention relates to a tapering tool for cutting a taper on the end of a cylindrical pipe.

The disclosure herein has been shown but not specifically claimed in the abandoned application of Joseph G. Atwood, Serial No. 290,529, filed May 28, 1952, and assigned to the assignee of the present invention.

Numerous tapering tools have heretofore been devised but they have not gained widespread acceptance because of their generally complicated structure, inconvenient mode of operation, high cost of manufacture and inability to cut a smooth, regular taper.

Accordingly, it is an object of this invention to provide a taper cutting tool having a simplified structure with a minimum number of parts and a facile mode of operation.

Another object of this invention is to provide a mandrel which can be inserted interiorly of a pipe and rapidly locked into position for beginning the taper cutting operation.

A further object of this invention is to provide a feeding mechanism which causes a uniform taper to be cut and which has a quick return to starting position.

A still further object is to provide a locking mechanism of simplified construction which enables easy engagement of the mandrel and its operating crank.

Other objects will appear at appropriate times throughout the description and claims.

One embodiment of the invention is illustrated in the accompanying drawing, of which:

Fig. 1 is a side elevation of the tapering tool partly in section, and shown in conjunction with a fiber conduit pipe, shown in section.

Fig. 2 is an end view in section taken on the line 2—2 of Fig. 1.

Figure 3:
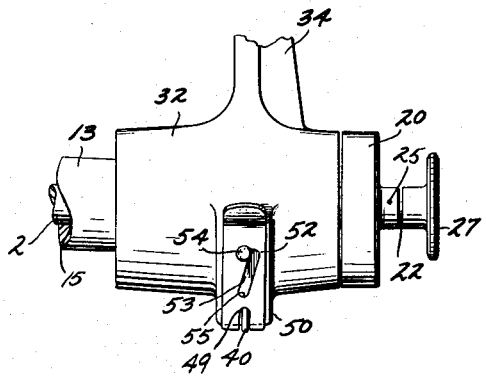
Fig. 3 is a side view of the hub showing the latching mechanism.

Fig. 1 illustrates the novel taper cutting tool inserted within a fiber tube 1. The mandrel portion of the cutting device comprises a shaft 2 having its axis coincident with the longitudinal axis of the fiber pipe 1. At one end of shaft 2 and threadedly engaged with portion 3 is a collar 5. Longitudinally along shaft 2 is another collar 5a which has a centrally located bore 9 journaled on shaft 2. Collars 5 and 5a are substantially similar and each has a flange 6 on its outer face. A rubber or resilient ring 7 bears against each flange 6 of collars 5 and 5a. The outer periphery of ring 7 is in concentric relation to the interior wall of pipe 1. A hollow cylinder 8 is disposed between and bears against the rubber rings 7. A cotter pin 11 through the threaded end portion 3 of shaft 2 acts as a retainer to retain the entire mandrel assembly on shaft 2 at its end interiorly of the fiber pipe 1.

Shaft 2 has an enlarged portion in diameter extending from pipe 1 and having at one end a lead screw 12. A tapered sleeve 13 is journaled on lead screw 12 of shaft 2. One of the ends of sleeve 13 is in bearing relation with face 6a of collar 5a of the mandrel assembly. Although the enlarged portion of the shaft acts as a retaining means for limiting movement of the collar 5a in one direction on the shaft, it will be obvious to those skilled in the art, that the portion 12 may be of the same diameter as the shaft 2 on which event the sleeve acts as a retaining means for preventing the collar 5a from moving outwardly of the fiber pipe or away from its mating collar 5. Sleeve 13 is retained against sliding movement in one direction by a snap ring 18 circumjacent to and disposed in an annular groove 19 in shaft 2 near its outer end. It will be seen in Fig. 1 that the axis of the outer periphery of sleeve 13 is angularly disposed in relation to the longitudinal axis of shaft 2. The taper ultimately cut upon the end of pipe 1 will conform to the same angle. The outer wall of sleeve 13 has a keyway slot 14 cut therein extending from one end longitudinally a distance substantially coextensive with the length of the lead screw 12 of shaft 2.

A hub 32 having a smooth bore 32a is revolvably carried by the outer periphery of sleeve 13. To impel the hub 32 longitudinally along the sleeve 13 during a taper cutting operation, a shoe 37 disposed in slot 14 and having a threaded face 37a is provided. Shoe 37 has a shank portion 38 radially disposed relative to the shaft 2 and extending through a round hole 36 in hub 32. A lifting lever 40 pivotally carries shoe 37 on pin 41 in shank portion 38 of shoe 37. The threaded face 37a of the shoe 37 is normally biased into threaded engagement with lead screw 12 on shaft 2 by a spring 44 which is disposed in a recess 46 in hub 32. This spring acts upon the end of lifting lever 40.

Axial alignment of compression spring 44 is maintained by interposing it between two anchoring protuberances, one being a pin 45 and the other a protuberance 43 on lever 40. The force tending to bias the shoe 37 inwardly toward the axis of shaft 2 and against lead screw 12 is produced by the action of spring 44 urging the lever 40 about a fulcrum or pivot 42.

A latching mechanism is provided for retracting shoe 37 from threaded engagement with lead screw 12. This mechanism, which may be best seen from Figs. 2 and 3, comprises a latching plate 52 having one of its ends bifurcated to define a notch 49 engageable with one end of the lifting lever 40. An L-shaped slot 53 perforates latching plate 52. Slot 53 encompasses a headed pin 54 which is firmly anchored in a rectangular boss 50 of hub 32 and which slidably holds plate 52 against boss 50. Advancement and retraction of the shoe 37 is accomplished by sliding latching plate 52 along guide slot 53. When the latching plate 52 is in the position shown in Fig. 3, one leg of the L-shaped slot 53 bears in contact relation to head pin 54. When in this position, lifting lever 40 is urged upwardly by the inner margin of notch 49 and said lever is caused to pivot about pin 42 in opposition to the compressive force of spring 44. Under these conditions the threaded shoe 37 is retracted from the lead screw 12 on shaft 2. Consequently, there is no interlocking or mechanical connection between hub 32 and lead screw 12. Therefore, when the latching plate is in the position shown in Fig. 3, the hub is free to move longitudinally along the taper sleeve 13.

It will be noted also that when threaded shoe 37 is retracted from lead screw 12 said shoe is still disposed within key slot 14 of sleeve 13. If crank 34 is revolved under these conditions about the axis of shaft 2, the shoe 37 will engage the sleeve 13 within slot 14 and the combination of hub 32 and sleeve 13 will revolve freely on lead screw 12.

Figure 4:
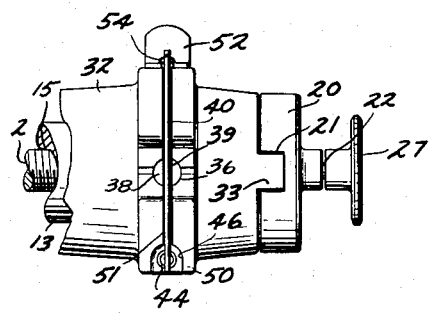
Fig. 4 is a top view showing the locking plate and screw feed engaging mechanism.

A novel mechanism is provided for mechanically interlocking the hub 32 with the shaft 2. Attention is directed to Figs. 1 and 4. These figures show a locking plate 20 which comprises a cylindrical member having across its inner face a groove 21. Groove 21 is engageable with lugs 33 protruding from the face of hub 32. Groove 21 of locking plate 20 also receives a flattened tongued end portion 16 of shaft 2. When the tongued end portion 16 and lugs 33 are simultaneously received by groove 21, the hub 32 and shaft 2 are mechanically interlocked.

Locking plate 20 has a hole 28 coincidental with its axis for revolving on a screw 22 which has a threaded portion 23 screwed into the end of shaft 2. Locking plate 20 is permitted to revolve on screw 22 but is retained against sliding thereon by a retaining pin 25 which extends into annular groove 24 which is cut in the outer periphery of screw 22. Screw 22 has its end portion 26 serrated for tightly receiving a knob 27. Rotation of screw 22 by means of knob 27 to withdraw it from the shaft causes groove 21 of locking plate 20 to be backed clear of lug 33 and tongue 16, so that the hub 32 and shaft 2 are not mechanically connected.

Figure 5:
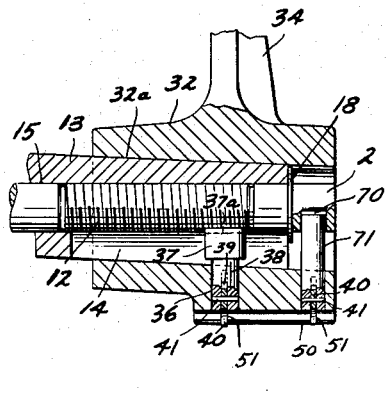
Fig. 5 is a fragmentary side view, in section, showing an alternative form of locking mechanism.
Figure 6:
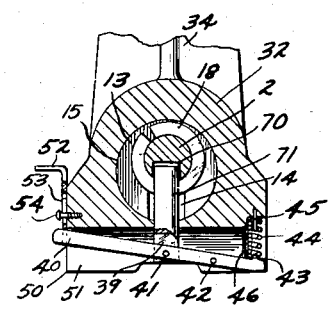
Fig. 6 is an end view of embodiment shown in Fig. 5.

An alternative form of mechanism for interlocking hub 32 and shaft 2 is shown in Figs. 5 and 6. To substitute this locking mechanism in place of locking plate 20 and the tongue and groove arrangement heretofore described, it is necessary to turn shaft 2 to a diameter at its end equal to the diameter of the lead screw 12. A hole 70 is then drilled radially into shaft 2 and adapted to receive a locking pin 71. Pin 71 is advanceable and retractable into hole 70 by virtue of it being carried pivotally on a lever 40 identical to the lever 40 which carries shoe 37. The lever 40 may be biased by a spring 44 and positioned by a latching plate 52 in a manner similar to the means shown for moving and positioning the shoe 37. The purpose of this locking means is identical to that of the locking plate assembly and its mode of operation is self-evident.

A hand crank 34 is preferably cast integral with hub 32 and is provided with a rib 60 substantially disposed parallel to the longitudinal axis of shaft 2. Rib 60 has slot 62 cut therein radially relative to the axis of shaft 2 for receiving cutting tool bit 63 and end facing bit 64. These bits are restrained against radial movement outward from the axis of shaft 2 by means of a clamping plate 65 which has clearance holes 67 through its face. These clearance holes freely receive adjusting screws 66 which have a threaded portion 68 screwed into the rib 60 of crank 34. When these screws are turned down so that their heads bear against clamping plate 65, the clamping plate in turn bears in high pressure relation to tool bits 63 and 64, thereby securing the bits tightly within slot 62.

The use and operation of my invention is as follows: When it is desired to cut a taper on the end portion of a fiber pipe 1 such as is illustrated in Fig. 1, the mandrel assembly is inserted within the pipe 1. During this operation, the rubber rings 7 carried by the collars 5 and 5a are in loose concentric contact relation to the interior walls of pipe 1. While the entire mandrel assembly is resting within pipe 1, the operator may turn screw 28 into the end of shaft 2 by means of revolving knob 27 clockwise. The tightening of screw 22 causes the locking plate to advance to receive lug 33 of hub 32 and simultaneously receive the tongued end portion 16 of shaft 2 as shown in Fig. 4. Hub 32 is then slid along the sleeve 13 so that it bears tightly against locking plate 20. Latching plate 52 is then tripped sidewise to dispose the headed pin 54 in registry with vertical portion of the slot 53 and is then moved vertically until the pin is positioned at the lower end 55 of the slot. Under these conditions, spring 44 urges lever 40 to pivot about fixed pin 42 and to bias the shoe 37 upwardly to engage it with the lead screw 12 of shaft 2. When the shoe 37 is engaged with lead screw 12, it will be noted that hub 32 is restrained from sliding movement upon sleeve 13. It is to be further noted that when locking plate 20, lugs 33 and tongued end portion 16 are engaged, the hub 32 is directly and rigidly mechanically connected to shaft 2. Upon rotation of crank 34, shaft 2 will rotate and threaded portion 3 thereof will urge the collar 5 toward its mating collar 5a. When this occurs, the flanges 6 of collars 5 and 5a will exert a sidewise force on the rubber ring 7. Collar 5a, though it is freely and slidably carried on shaft 2, will not slide longitudinally thereon because its face 6a butts the end portion 17 of sleeve 13. Sleeve 13, of course, may not slide upon the lead screw 12 because it thrusts against snap ring 18 near the end of shaft 2. Consequently, when shaft 2 is turned as described, the compressive force generated by the bearing relation of flange 6 on ring 7 is transmitted to the rubber ring on collar 5a by means of a solid cylindrical member 8 interposed between and bearing upon said rubber ring. A radial expansion of rubber rings 7 is thereby effected and rings 7 are caused to tightly grip the interior walls of fiber conduit pipe 1.

Attention is directed to Fig. 1 where the solid lines indicate the position of the cutting bit 63 at the commencement of the taper cutting operation. It is to be noted that the cutting bit 63 bears against the end of conduit 1. This position may be attained by pushing the hub forward until the cutting bit contacts pipe 1 as shown.

To proceed with the taper cutting operation, it is necessary that the latching plate 52 be released from its position in Fig. 3 so that the end portion 55 of the L-shaped slot 53 in latching plate 52 approaches headed pin 54. Before proceeding with the taper cutting operation, the locking plate is moved outwardly to disengage the lug 33 of hub 32 and the tongued end portion 16 of shaft 2 from the groove 21 in locking plate 20 as previously described. With the threaded face 37a of shoe 37 in engagement with lead screw 12 of shaft 2, the crank 34 may be manually revolved about the axis of shaft 2. Shoe 37, being connected to hub 32, carries hub 32 longitudinally with it and slidably along the outer periphery of sleeve 13. The movement of cutting bit 63 will duplicate the helical movement of the shoe 37 as it follows its helical path about the lead screw 12. It will be observed that shoe 37 fits freely in key slot 14 of hub 32. Consequently, upon rotation of crank 34, sleeve 13 is also caused to rotate on lead screw 12. Simultaneously, hub 32 is caused to slide axially upon the outer periphery of sleeve 13. The angle of the tapered surface generated on the pipe 1 relative to the axis of the pipe is the same as the angle of the periphery of the sleeve 13 is to the axis of shaft 2.

When the desired taper has been cut on the end of fiber pipe 1, the end facing cutting bit 64 is adjacent the end of pipe 1. Cutting bit 64 may have its cutting edge ground at any desired angle to conform it to the chamfer desired at the end of the pipe.

After the taper cutting operation has been completed, removal of the mandrel assembly is a relatively simple operation. It is only necessary to back the hub 32 against the locking plate 20 by simply retracting shoe 37 to disengaged position relative to lead screw 12 of shaft 2 and then slide hub 32 upon sleeve 13 to its stop position against locking plate 20. Shoe 37 is then allowed to advance to threaded engagement with lead screw 12, and screw 28 is turned clockwise to bring locking plate 20 into engagement with lugs 33 and tongued end 16 of shaft 2. This latter operation brings the crank 34 into rigid mechanical connection with shaft 2. Now a few additional counterclockwise turns of shaft 2 cause thread 3 to back out of hole 4, thereby allowing collar 5 to proceed inwardly of the pipe. When this takes place, the resilient force of rubber ring 7 tends to cause them to expand longitudinally and to contract radially, thereby reducing the outside diameter of ring 7 and freeing the outer periphery of said ring from contact engagement with the interior walls of pipe 1. Now the taper cutting tool can be removed from the pipe upon which the taper has been cut by manually removing it from the pipe.

Attention is directed to several additional advantages which are inherent in the described tapering tool but not readily apparent to one who has not actually used the tool to cut a taper on a pipe.

It is to be appreciated that the tool is capable of exerting sufficient force on the interior of a fiber pipe, upon which a taper is to be cut, to form the wall of the pipe into a perfect circle concentric with the mandrel collars. Hence, though the cross section of a fiber pipe may be elliptical prior to insertion of the tapering tool within its bore, the tool will restore the concentricity to the pipe thereby assuring that a taper of equal depth will be cut about the periphery of the pipe end. Removal of the tapering tool from the pipe will permit it to resume its elliptical shape but, no harm results because circularity of the tapered end is restored when it is ultimately driven into a fitting or another pipe having a circular hole.

In addition, the use of soft resilient rubber rings to engage the interior of the pipe enables the development of secure frictional engagement between the mandrel and fiber pipe without impressing or scoring its interior surface and without danger of fracturing it. If the inside diameter of a particular piece of pipe happens to be slightly undersize, the resilient rings will not expand radially unlimited when the mandrel is tightened but will flow or yield longitudinally to relieve the radial stress. This feature will inherently prevent fracture of the pipe but, of course, one skilled in the art will recognize that very little tightening of the mandrel is needed to secure it within the pipe.

A final advantage lies in the tapering tool requiring very little effort to operate by reason of the mechanical advantage incidental to the use of a fairly long crank lever in combination with a lead screw of small thread pitch. Hence, an operator can easily exert sufficient effort to turn the crank orbitally to cut a fine, smooth taper without the necessity of the operator exerting any force in the direction of the cut to develop longitudinal feed.

It is claimed:

1. A tool for tapering an end of a cylindrical pipe comprising a shaft having a threaded end, clamping means adjacent said threaded end expansible radially into engagement with the inner periphery of said pipe, a lead screw at the other end of said shaft, a sleeve journaled on said lead screw and having the axis of its outer periphery inclined to the axis of said shaft, said sleeve having a slot through its wall extending in the direction of the shaft axis, a hub slidable on said sleeve, a shoe having a threaded face disposed within said key slot and threadedly engageable with said lead screw, shoe positioning means carried by the hub and carrying said shoe for advancing and retracting said threaded face into and out of engagement with the lead screw, cutting tool means rotatable with said hub, whereby rotation of said hub when said threaded face and lead screw are engaged will urge said hub along said sleeve at an angle with respect to the axis of said shaft and said pipe.

2. A tool for tapering the end of a cylindrical pipe comprising a shaft having one end for extending into a pipe, expansible means carried on said one end for compressively engaging a pipe interior in response to rotation of said shaft, a sleeve journalled on the other end of said shaft and secured against sliding toward said one end, said sleeve having the axis of its outer periphery inclined to the axis of said shaft and having a longitudinally disposed keyslot therein, a driving member slidably carried on said sleeve, means carried by said driving member and extending into said keyslot for interconnecting said driving member and sleeve whereby said driving member may slide longitudinally of the sleeve in fixed angular relation therewith, and a cutting bit supported by said driving member, said cutting bit tracing a cone of revolution when said rotatable member is rotated with and axially advanced on said sleeve.

3. In a tool for tapering the end of a cylindrical pipe which includes an expansible mandrel operable into gripping relation with the interior of said pipe by means of rotating a threaded shaft; a shaft connected to said mandrel at one end and having a tongue projecting from its other end, a lead screw on said shaft adjacent said tongue, a sleeve journaled on said lead screw, a hub having a lug projecting in the direction of said tongue, said hub being slidable on said sleeve and rotatable therewith, a locking plate having a groove for receiving said lug and tongue simultaneously, screw means carrying said locking plate and operable to urge said groove into registry with said lug and tongue, and cutting tool means mounted on said hub for advancement along said sleeve.

4. A tool for tapering an end of a cylindrical pipe comprising a shaft having a threaded portion at one end and a radial hole at the other end, clamping means at said one end of said shaft expansible radially into engagement with the inner periphery of said pipe, a lead screw at the other end of said shaft, a sleeve journaled on said lead screw and having a key slot through its wall extending longitudinally parallel to the axis of said shaft, a hub slidable longitudinally on said sleeve, threaded shoe means carried by said hub engageable with said lead screw within said key slot, a lever pivotally carried by said hub, a locking pin pivotally carried by said lever, said pin being advanceable and retractable relative to said radial hole in said shaft, a latching plate carried by said hub and engageable with said lever for selectively inserting and withdrawing said locking pin relative to said shaft.

5. A tool for tapering an end of a cylindrical pipe comprising a shaft having a threaded portion at one end, a first collar threadedly engaged with and concentrically related to said threaded portion, a second collar on said shaft axially spaced from the first collar and retained against sliding movement relative thereto, said collars each having a radial flange on an end most remote from the other collar, a resilient ring circumjacent to each of said collars and expansible radially into engagement with the inner periphery of said pipe, said resilient ring having an outside diameter greater than the outside diameter of said flanges whereby excessive radial pressure on said rings may be relieved by longitudinal yielding thereof relative to said collars, cylindrical spacing means mounted on said collars having a diameter less than the outside diameter of said resilient rings and interposed between said rings in bearing relation therewith, a hub rotatable about the other end of said shaft, releasable means for interlocking said hub and said shaft whereby said shaft may be rotated relative to said collars and thereby move said collars relative to each other axially of said shaft.

6. A tool for tapering an end of a cylindrical pipe comprising a shaft having a threaded portion at one end, clamping means at one end of said shaft expansible radially into engagement with the inner periphery of said pipe, a lead screw at the other end of said shaft, a sleeve journaled on said lead screw and having the axis of its outer periphery inclined to the axis of said shaft, said sleeve having a key slot through its wall extending longitudinally parallel to the axis of said shaft, a hub slidable longitudinally on said sleeve, a shoe having a threaded face disposed within said key slot and threadedly engageable with said lead screw, lever means pivotally mounted intermediate its ends on said hub and carrying said shoe, spring means interposed between said hub and said lever biasing said shoe into threaded engagement with said lead screw, a latching plate adjacent said hub and having a slot therethrough, pin means encompassed by said slot for positioning said latching plate relative to said hub, bifurcated ends on said latching plate for receiving and holding said lever means in opposition to said spring, and releasable means for interlocking said shaft and said hub.

7. A tool for tapering an end of a cylindrical pipe comprising a shaft having a threaded portion at one end, a first collar threadedly engaged with and concentrically related to said threaded portion, a second collar on said shaft axially spaced from the first collar and retained against sliding movement relative thereto, a resilient ring circumjacent to each of said collars and expansible radially into engagement with the inner periphery of said pipe, a cylindrical spacer interposed between said rings and bearing thereagainst, a lead screw at the other end of said shaft, a sleeve journaled on said lead screw and having the axis of its outer periphery inclined to the axis of the shaft, said sleeve having a key slot through its wall extending longitudinally parallel to the axis of said shaft, a hub slidable longitudinally on said sleeve and having a lug projecting from one end, a shoe having a threaded face disposed within said key slot and engageable with said lead screw, lever means pivotally mounted intermediate its ends on said hub and pivotally carrying said shoe, spring means interposed between said hub and said lever means biasing said shoe into threaded engagement with said lead screw, a latching plate adjacent said hub and having an L-shaped slot therethrough, pin means encompassed by said slot for positioning said latching plate relative to said hub, a tongued end on said shaft, a locking plate adjacent said tongued end and having a groove for simultaneously receiving said lug and said tongued end, and screw means revolubly carrying said locking plate for advancing and retracting said locking plate.

References Cited in the file of this patent

UNITED STATES PATENTS

| | | |
|---|---|---|
| 2,407,101 | Rosenboom | Sept. 3, 1946 |
| 2,537,916 | Rosenboom | Jan. 9, 1951 |
| 2,616,462 | Haddican | Nov. 4, 1952 |
| 2,645,143 | Larson | July 14, 1953 |